(12) United States Patent
Matsumoto et al.

(10) Patent No.: US 7,677,994 B2
(45) Date of Patent: Mar. 16, 2010

(54) BALL THROWING AND RETRIEVING DEVICE

(75) Inventors: Susan Matsumoto, Lantana, FL (US);
Melvin Kennedy, Lantana, FL (US);
Richard C. Levy, Bethesda, MD (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 0 days.

(21) Appl. No.: 11/681,307

(22) Filed: Mar. 2, 2007

(65) Prior Publication Data
US 2008/0004140 A1 Jan. 3, 2008

Related U.S. Application Data

(60) Provisional application No. 60/806,407, filed on Jun. 30, 2006.

(51) Int. Cl.
*A63B 59/02* (2006.01)
*A63B 65/12* (2006.01)
(52) U.S. Cl. ..................................... 473/510
(58) Field of Classification Search ................ 473/510, 473/505, 509, 511, 127; 119/707; D30/160; 124/5; 273/317
See application file for complete search history.

(56) References Cited

U.S. PATENT DOCUMENTS

| | | | | | |
|---|---|---|---|---|---|
| 491,558 | A | * | 2/1893 | Hill | 124/5 |
| 1,175,035 | A | * | 3/1916 | Wooster | 124/5 |
| 1,535,029 | A | * | 4/1925 | Murch | 124/5 |
| 2,124,738 | A | * | 7/1938 | Johnsen | 124/5 |
| 3,206,202 | A | * | 9/1965 | Evans | 473/127 |
| 3,428,036 | A | * | 2/1969 | Parker | 124/5 |
| 3,565,429 | A | * | 2/1971 | Williams | 473/127 |
| 3,589,349 | A | * | 6/1971 | Parker | 124/5 |
| 4,870,773 | A | * | 10/1989 | Schmucker et al. | 43/12 |
| 5,423,543 | A | * | 6/1995 | Tarrant | 473/286 |
| 6,076,829 | A | * | 6/2000 | Oblack | 273/317 |

* cited by examiner

*Primary Examiner*—Gene Kim
*Assistant Examiner*—M Chambers
(74) *Attorney, Agent, or Firm*—Dorsey & Whitney LLP

(57) ABSTRACT

An apparatus for throwing and picking up a sphere. A user may employ the apparatus, for example, to throw a sphere. The user may also employ the apparatus to pick up the sphere without requiring any portion of the user come into contact with the sphere. The apparatus may include a claw or gripper for holding the sphere. The claw may have three or more prongs for gripping the sphere and may be attached to a handle. The handle may telescope from a retracted position to an operating position. The handle may include gripping surfaces to aid a user in holding the handle, and a clip for attaching the throwing apparatus to a belt, a hanger or other suitable support.

10 Claims, 10 Drawing Sheets

BALL THROWING AND RETRIEVING DEVICE

CROSS-REFERENCE TO RELATED APPLICATIONS

This application claims the benefit of U.S. provisional patent application No. 60/806,407 filed on Jun. 30, 2006 and entitled "Ball Throwing and Retrieving Device" which is hereby incorporated by reference herein in its entirety.

BACKGROUND OF THE INVENTION

1. Technical Field

The present invention relates generally to a pet toy, and more particularly to a device for throwing and/or picking up a sphere, such that the sphere may be fetched by an animal.

2. Background Art

Many animals, especially canines, enjoy fetching objects such as sticks or balls. Pet owners commonly throw a ball some distance for the pet to retrieve and return to the owner. Such activity not only exercises the pet but strengthens the bond between pet and owner.

When a ball is picked up in an animal's jaws, the ball is often coated with saliva from the animal's mouth. People typically find touching or picking up a ball covered with animal saliva unpleasant. Thus, once the ball is coated, a pet owner generally has a disincentive to continue playing with his or her animal.

Additionally, some animals may become possessive and snap at a person's hand when he or she attempts to retrieve the ball.

Accordingly, an improved device for throwing and retrieving a ball is needed.

SUMMARY OF THE INVENTION

Generally, one embodiment of the present invention takes the form of an apparatus for throwing and picking up (or retrieving) a sphere. A user may employ the embodiment, for example, to throw a sphere (such as a ball). The user may also employ the embodiment to pick up the sphere without requiring any portion of the user come into contact with the sphere.

One exemplary embodiment generally includes a claw for engaging and holding a sphere, such as a ball. The claw is formed from a main claw body and three prongs extending from the claw body. The three prongs generally engage the sphere as described in more detail below. The prongs may be formed integrally with the claw body or separately and affixed thereto.

The gripper is attached to a handle at the handle's top end. The handle may telescope to extend the overall length of the handle. In a first position, the handle may be retracted for storage, carrying, and convenience. The user may extend the handle to lengthen the handle for throwing and/or retrieving a ball. The handle is typically (although not necessarily) made of multiple handle segments. The handle segments may nest within one another in the first position and extend outwardly, one from the other, to a maximum handle length in the second position. In alternative embodiments, the handle may be non-telescoping and/or of a fixed length.

Typically, the user grasps the handle in order to manipulate the embodiment. For example, the user may move the claw into contact with a sphere by manipulating the handle, or toss a sphere from the embodiment by swinging the handle in an arc. Another exemplary embodiment of the present invention takes the form of a ball-throwing apparatus, including a claw-shaped member operative to grasp a ball and a handle attached to the claw-shaped member, wherein the claw includes a first prong, a second prong operatively attached to the first prong, and a third prong operatively attached to the first prong. In such an embodiment, the first prong may extend further from a longitudinal axis of the handle than the second prong and third prong. Additionally, in this exemplary embodiment the first prong and second prong may form a first shape, and the first prong and third prong may form a second shape. The first shape and second shape may be a C-shape, a V-shape, and/or a U-shape. Further, in the embodiment the first prong may be curved along its width. As yet another feature of the embodiment, the second and third prongs may be at least partially curved along their lengths, and optionally flat along their widths.

DETAILED DESCRIPTION OF THE INVENTION

Generally, one embodiment of the present invention takes the form of an apparatus for throwing and picking up (or retrieving) a sphere. A user may employ the apparatus, for example, to throw a sphere (such as a ball). The user may also employ the apparatus to pick up the sphere without requiring any portion of the user come into contact with the sphere.

One embodiment generally includes a claw or gripper for engaging and holding a sphere, such as a ball. The claw may be formed from a main claw body and three prongs extending from the claw body. The three prongs generally engage the sphere as described in more detail below. The prongs may be formed integrally with the claw body, or separate therefrom and affixed thereto.

The claw may attach to a handle at the handle's top end. The handle may telescope to extend the overall length of the handle. In alternative embodiments, the handle may be non-telescoping and/or of a fixed length. Typically, the user grasps the handle in order to manipulate the throwing/retrieving apparatus. For example, the user may move the claw into contact with a sphere by manipulating the handle, or toss a sphere from the throwing/retrieving apparatus by swinging the handle in an arc.

Figure 1A:
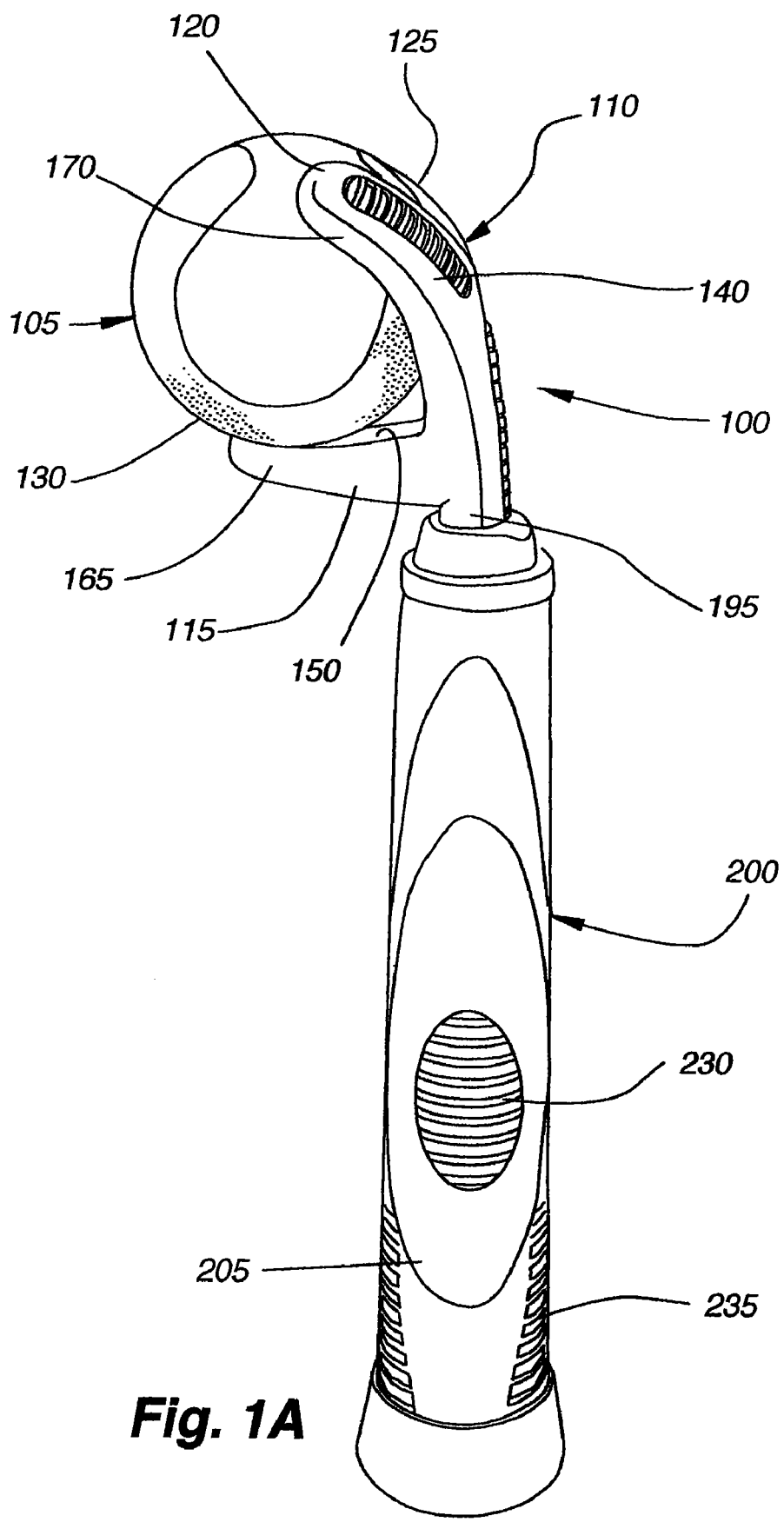
FIG. 1A is a side view of an embodiment of a throwing/retrieving apparatus with a ball fitted within the claw.
Figure 1B:
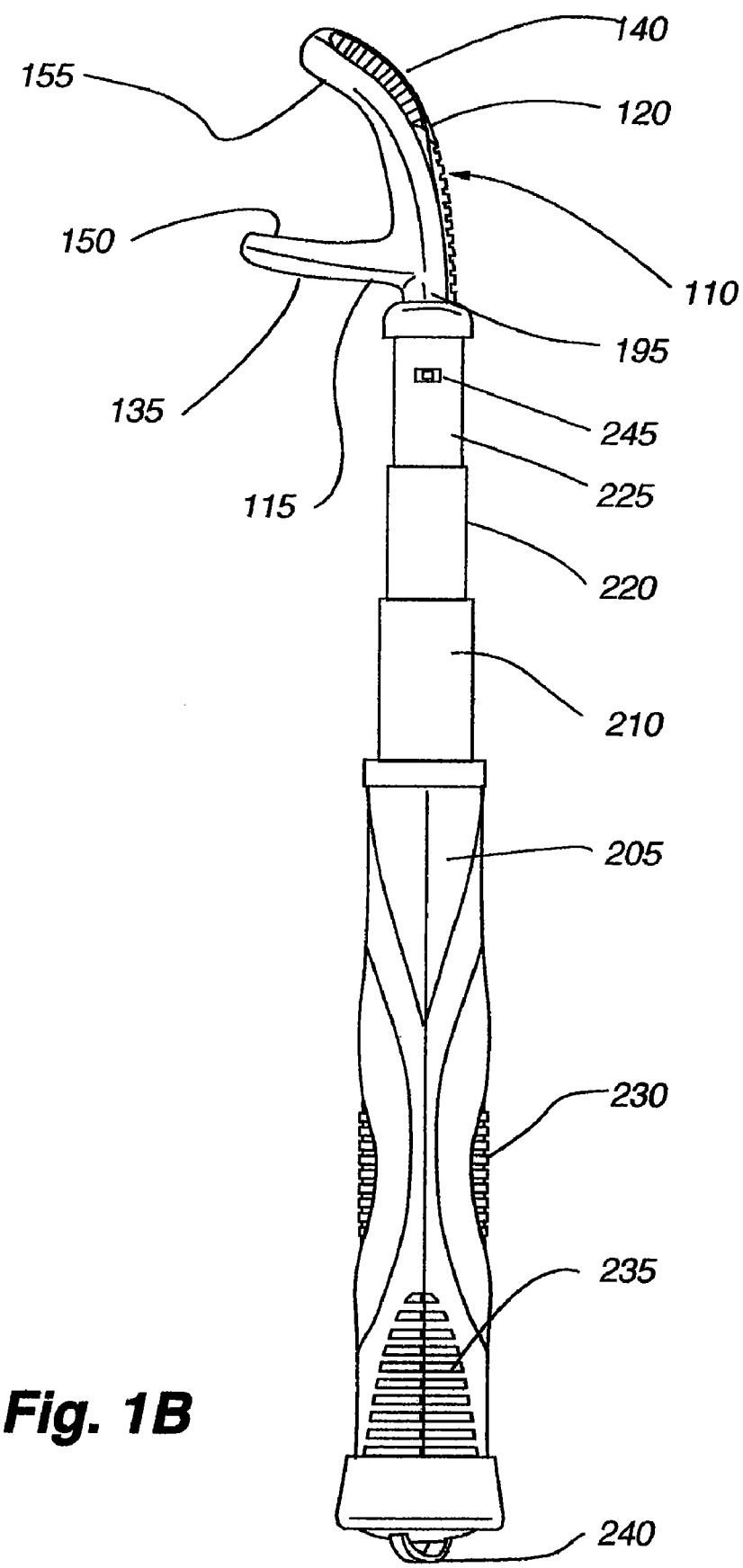
FIG. 1B is a side view of the embodiment without a ball fitted within the claw.
Figure 2:
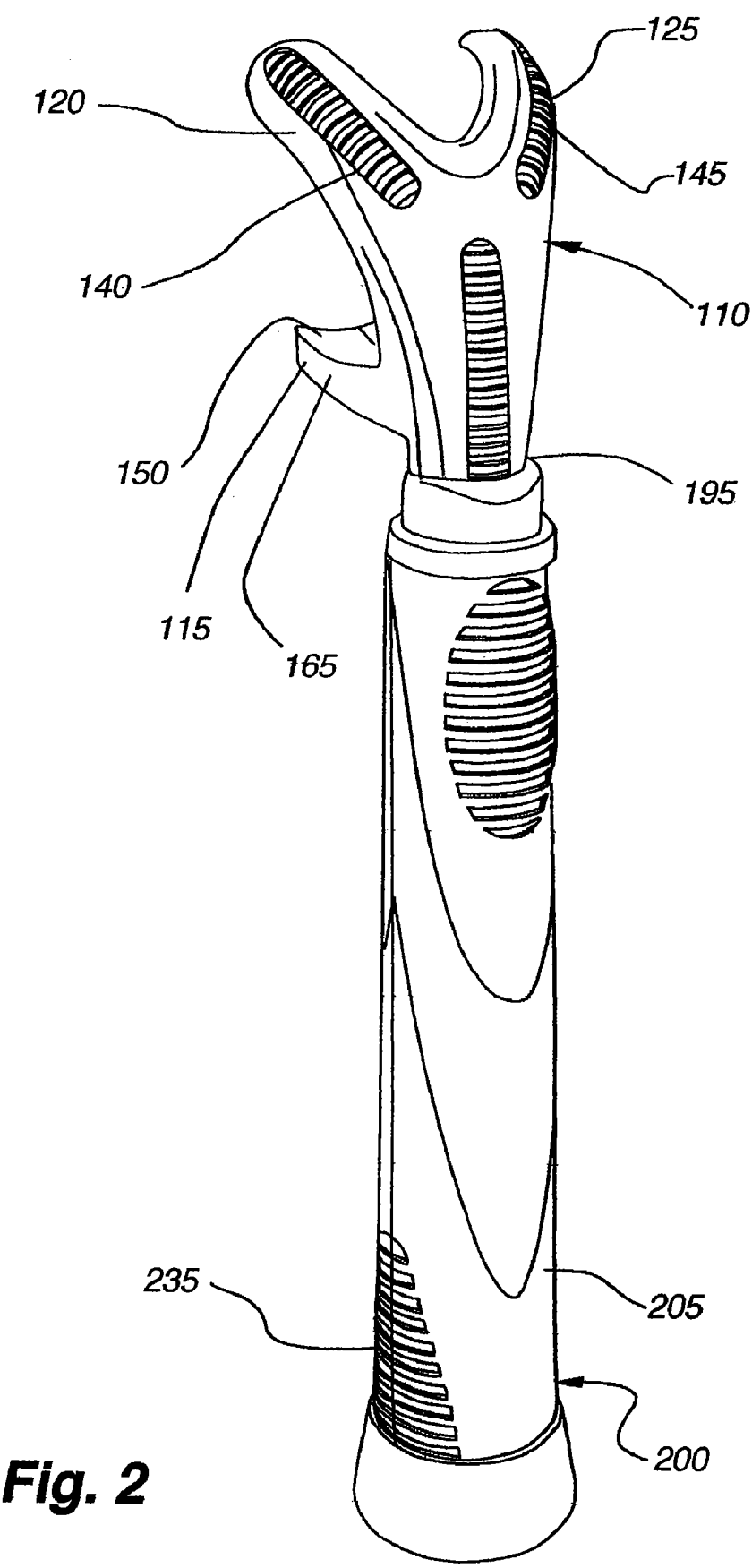
FIG. 2 is a rear perspective view of the embodiment without a ball in the claw.

Turning now to FIGS. 1A, 1B and 2, an embodiment of the throwing/retrieving apparatus 100 may be seen. FIG. 1A is a side view of the embodiment with a ball 105 fitted within the claw 110, while FIG. 1B is a similar side view without the ball 105 placed in the claw 110. FIG. 2 is a rear perspective view of the embodiment without a ball 105 in the claw 110. Generally, the first, second and third prongs 115, 120, 125 of the claw 110 are spaced and angled such that a ball or other suitable spherical object 105 may be placed between them and securely retained. The first, second and third prongs 115, 120, 125 may be at least partially flexible, bendable or deformable. Thus, when the prongs 115, 120, 125 come into contact with an appropriately sized spherical object 105 (such as a tennis ball), the prongs 115, 120, 125 may be deflected along the outer surface 130 of the spherical object 105. That is, each prong 115, 120, 125 may be deflected or flexed away from at least one other prong 115, 120, 125 as the claw 110 is pushed onto the spherical object 105.

The prongs 115, 120, 125 are typically made of a material that will return to its initial position when not under an outward or expanding force. Thus, the prongs 115, 120, 125 will be pushed outward to move along the ball or sphere's outer surface 130, but exert an inward force (i.e., a force towards the interior of the gripped ball 105) to hold the ball 105 between the prongs 115, 120, 125. In this manner, the ball 105 may be picked up inside the claw 110. The inward force of the prongs 115, 120, 125 against the ball 105 is typically sufficient to retain the ball 105 within the claw 110 until the throwing/retrieving apparatus 100 is swung to eject the ball 105, as described below. Friction between the prongs 115, 120, 125 and the ball 105 may also contribute to retention of the ball 105 in the claw 110. The claw 110, including the first, second and third prongs 115, 120, 125, may be made of any suitable material, such as a plastic or a metal.

Each prong 115, 120, 125 of the claw 110 has an outer surface 135, 140, 145 and an inner surface 150, 155, 160. Each outer and inner surface 135, 140, 145, 150, 155, 160 is joined by a left side 165, 170, 175 and a right side 180, 185, 190. Typically, and as seen in FIGS. 1A and 1B, a portion of the inner surface 150, 155, 160 of each prong 115, 120, 125 may be curved along a length of the prong 115, 120, 125 to match the outer surface 130 of a gripped ball 105. That is, each prong's inner surface 150, 155, 160 may curve from the point at which it joins the claw body 195 to its tip. In some embodiments, the entirety of the inner surfaces 150, 155, 160 of each prong 115, 120, 125 may be so curved. In alternative embodiments, only a portion of one or more prongs 115, 120, 125 may be curved in this manner.

Figure 3A:
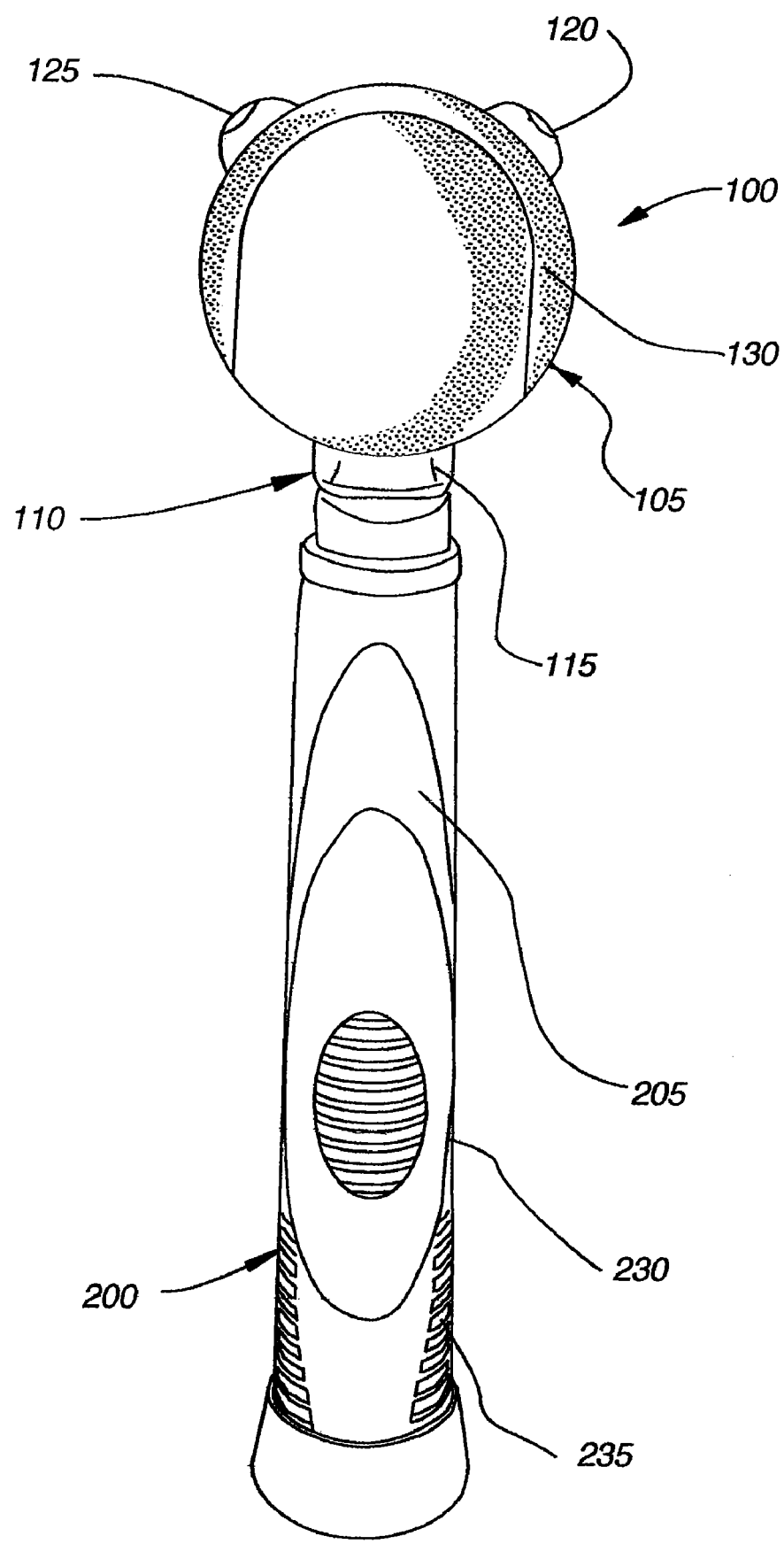
FIG. 3A is a front view of the embodiment gripping a ball.
Figure 3B:
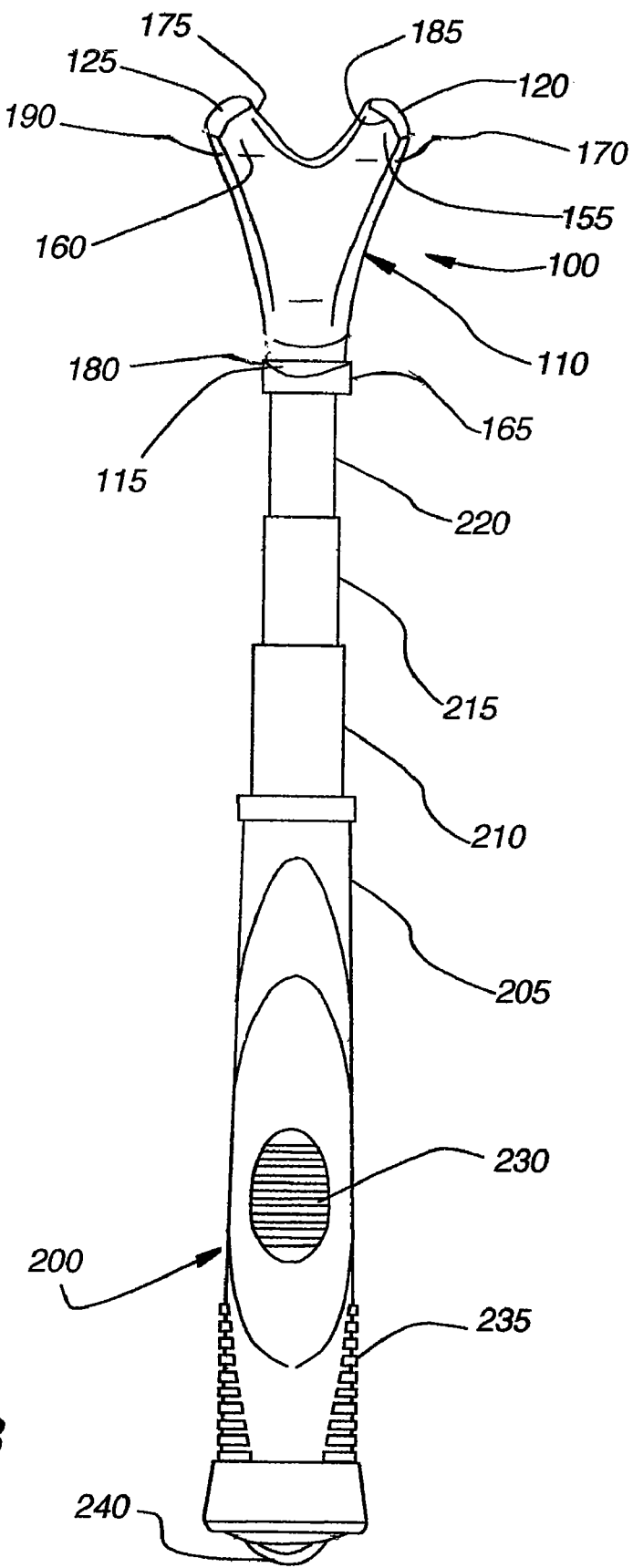
FIG. 3B is a front view of the embodiment without a ball fitted within the claw.
Figure 4:
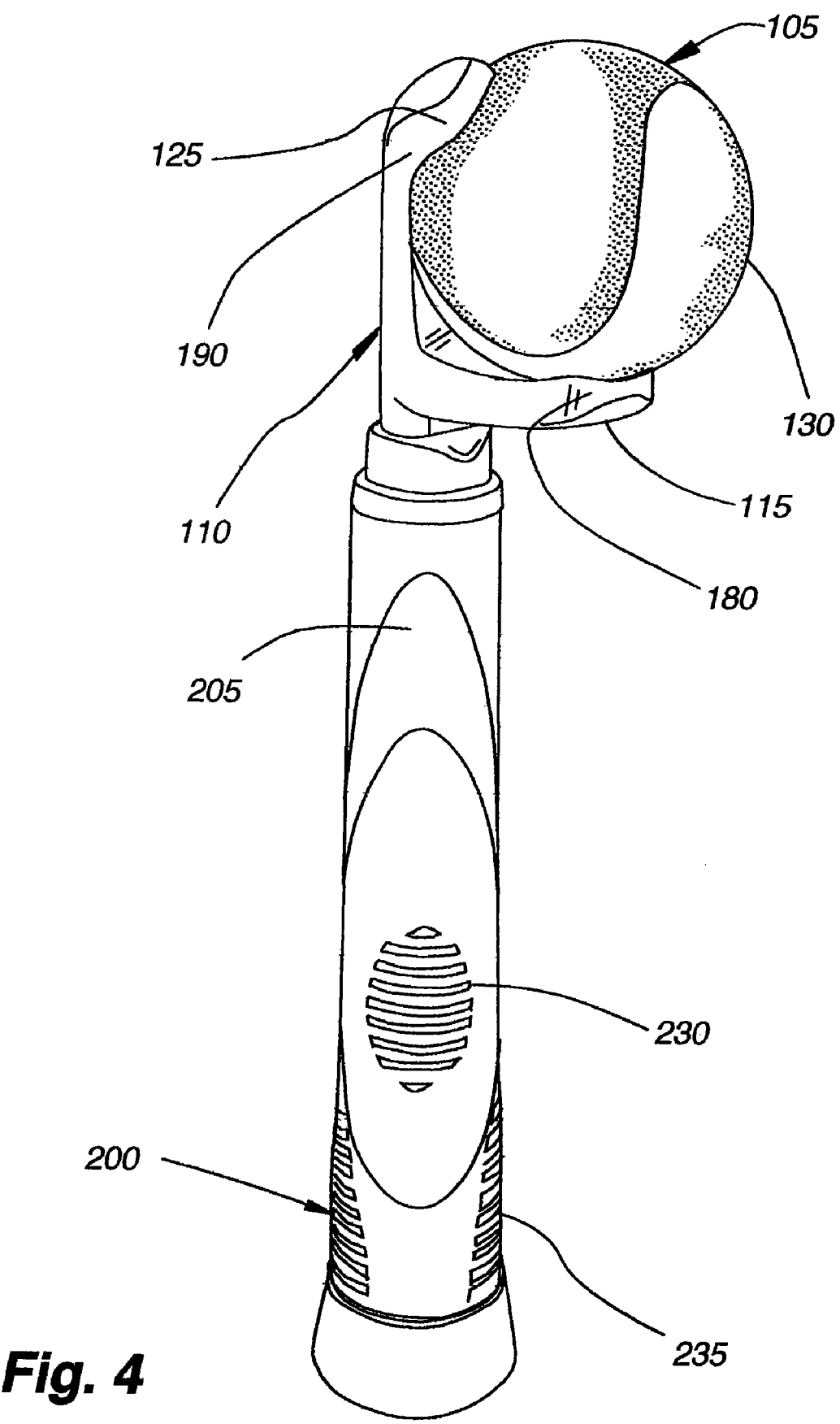
FIG. 4 is a front perspective view of the embodiment gripping a ball, showing the front and right sides of the embodiment.

The inner surfaces 150, 155, 160 of one or more prongs 115, 120, 125 may be curved in a different manner as well. In addition to being curved along its length (i.e., the direction from the joinder with the claw body 195 to the prong tip), a prong's inner surface 150, 155, 160 may be curved along its width. The width of the prong 115, 120, 125 is defined as the distance between each prong's right side 180, 185, 190 and left side 165, 170, 175. FIGS. 3A, 3B and 4, for example, show that the width of the first prong 115 is curved to generally contour to the outer surface 130 of the gripped ball 105. In the present embodiment, the second and third prongs 120, 125 are not curved along their widths, but only their lengths. In alternative embodiments, any combination of the first, second and third prongs 115, 120, 125 may be curved along either their lengths, widths, or both. Further, any of the prongs 115, 120, 125 may be curved along their entire width or length, or along only a portion thereof. For example, in the embodiment shown in FIGS. 1A, 1B and 2, only a portion of the width of the first prong's inner surface 150 is curved to match the shape of the ball 105.

Generally, the claw 110 is sized such that the distance between any two prongs 115, 120, 125 is less than the diameter of the ball 105 intended to be gripped by the throwing/retrieving apparatus 100. Thus, when the throwing/retrieving apparatus 100 is sized to grip a tennis ball 105, the distance between each prong 115, 120, 125 is less than the tennis ball's diameter. Accordingly, at least a portion of the ball 105 extends beyond a plane drawn between the edge of each inner surface 150, 155, 160 of adjacent prongs 115, 120, 125. This is seen to best effect in FIG. 3A, which is a front view of the throwing/retrieving apparatus 100 gripping a ball 105.

As previously mentioned, each of the first, second, and third prongs 115, 120, 125 abuts the claw body 195. The second and third prongs 120, 125 are at least partially curved along their inner and outer surfaces 140, 145, 155, 160, as shown in FIGS. 1A, 1B and 4 and discussed above. Returning momentarily to FIGS. 1A and 1B, the second and third prongs 120, 125 join the claw body 195 in a smooth, arcuate manner. By contrast, the first prong 115 extends at an angle slightly less than ninety degrees from the claw body 195 as again shown to best effect in FIGS. 1A and 1B. Further, the base of the first prong 115 and the claw body 195 generally meet at an angle, rather than a smooth curve. This is true both for the joint between the outer surface 135 of the first prong 115 and the claw body 195 and the joint between the inner surface 150 of the first prong 115 and the claw body 195.

The outer surface 135 of the first prong 115 is generally flat, as shown to best effect in FIGS. 1A and 1B. In alternative embodiments, this outer surface 135 may be curved, angled, or any other shape. By contrast, the outer surfaces 140, 145 of the second and third prongs 120, 125 in the present embodiment are at least partially arcuate. In alternative embodiments, these outer surfaces 140, 145 may be flat, angled, or any other desired shape.

Returning to FIG. 2, the second and third prongs 120, 125 extend away from the claw body 195 such that they form a curved V-shape. Further, the first prong 115 forms a V-shape with both the second prong 120 and the third prong 125. The angles between the first, second and third prongs 115, 120, 125 (and the associated V-shapes) provide secure gripping of the ball 105 in the claw 110, as well as three contact points for the claw 110 on the ball's surface 130. In alternative embodiments, a C-shape or U-shape may be formed between any or all of the prongs 115, 120, 125. The claw 110 may be thought of as a pair of V-shaped, C-shaped, or U-shaped members sharing a common base. That is, the first V-shaped member may be composed of the first and second prong 115, 120, while the second V-shaped member may be composed of the first and third prong 115, 125, and so on.

In the present embodiment, the claw body 195 may be narrower at its base than at the joint with the second and third prongs 120, 125, as shown in FIG. 2. The claw body 195 tapers from its top to its bottom. Additionally, as shown in FIGS. 1A and 1B, the claw body 195 angles or leans towards the prongs 115, 120, 125 along its length. That is, the back of the claw body 195 slopes toward the prongs 115, 120, 125 from its base to its top. The transition from the claw body 195 to the second and third prongs 120, 125 may curve in the present embodiment, as also shown in FIGS. 1A and 1B. In alternative embodiments, the claw body 195 may not be tapered or angled, and likewise the transition from the claw body 195 to the second and third prongs 120, 125 may not be curved.

As can be seen from FIGS. 1A, 1B and 4, the first prong 115 may extend further outward than the second or third prongs 120, 125. Accordingly, when the ball 105 is placed in the claw 110, the first prong 115 supports the ball 105 at a point further away from the longitudinal axis of the handle 200 than the points contacted by the second and third prongs 120, 125.

This difference in contact points between the first prong 115 and second and third prongs 120, 125 defines an opening for the claw 110.

In one embodiment, the opening is generally angled approximately 65 degrees from the longitudinal axis of the handle 200. When the embodiment is swung by a user with sufficient force (typically in an arc), the ball 105 may be thrown out of the claw 110. The angle of the opening enhances the ability of the user to throw the ball or sphere 105 from the claw 110 along a path initially parallel with, or at an angle above, a plane generally perpendicular to flat ground upon which the user stands. Thus, the ball 105 potentially may be thrown father and longer than if the opening were not angled in such a manner.

Figure 5:
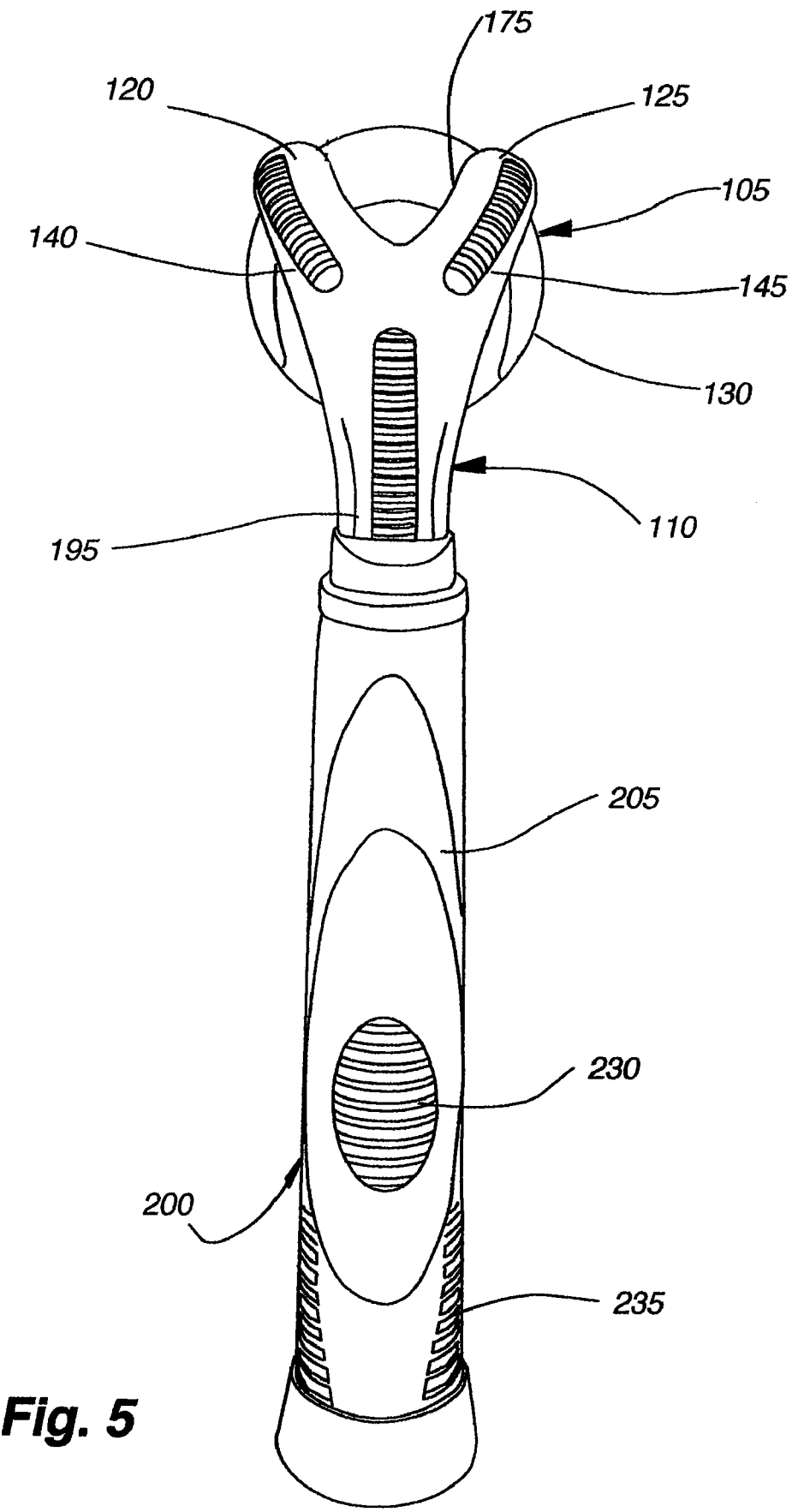
FIG. 5 is a rear view of the embodiment.
Figure 6:
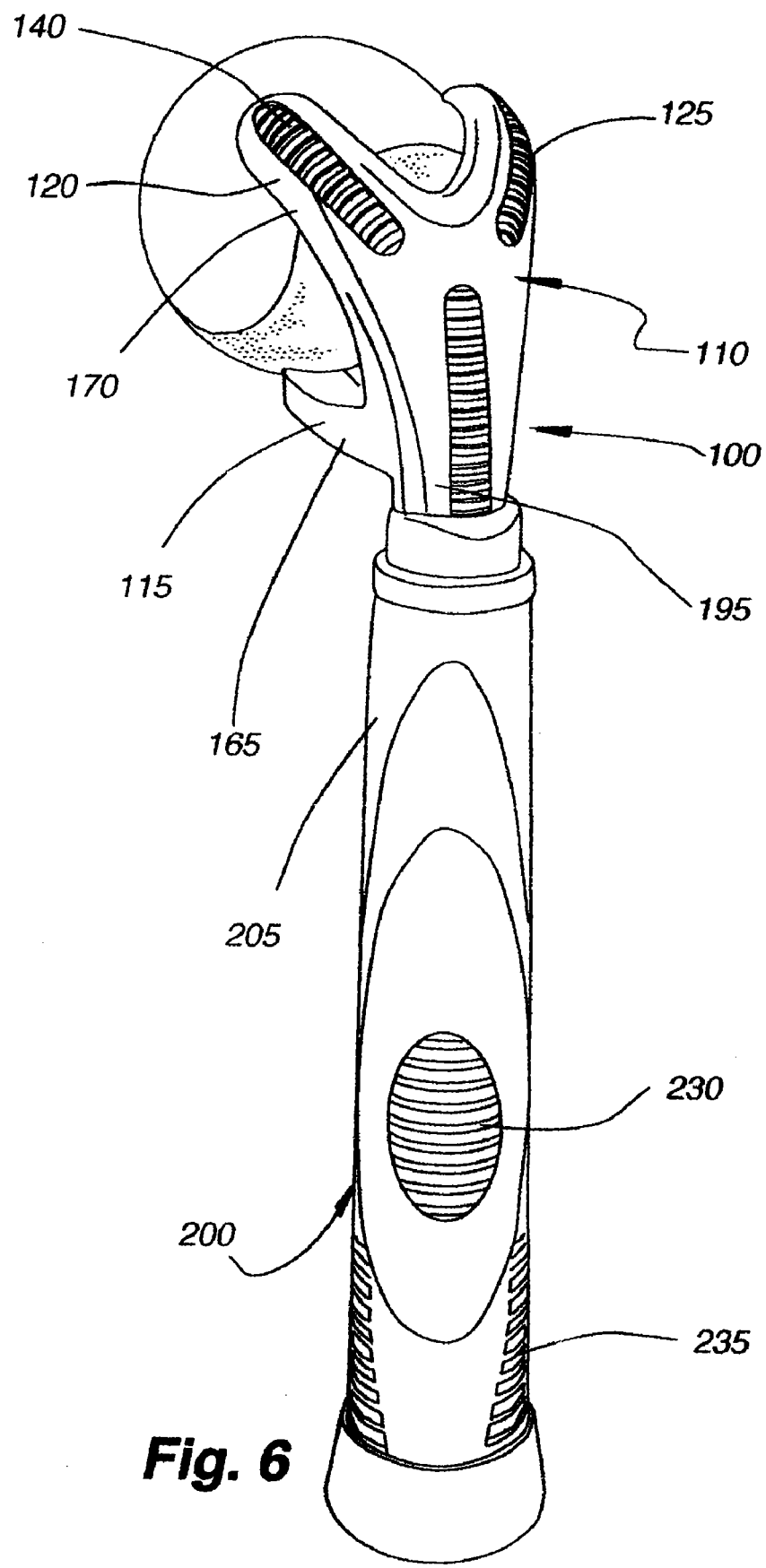
FIG. 6 is a perspective view of the embodiment showing the rear side and left side.

FIG. 5 generally depicts a rear view of the present embodiment of the throwing/retrieving apparatus 100. Similarly, FIG. 6 is a perspective view of the present embodiment showing the rear side and left side.

The top of the handle 200 of the present embodiment may be affixed to the claw body 195 at the claw body's base. The claw body 195 may be securely or releasably affixed to the handle 200 using any suitable means for joining elements together, including mechanical fasteners, adhesives, heat welds, and sonic welds. For some embodiments, the claw 110 or a portion of the claw 110 may be integrally formed with the handle 200.

Figure 7:
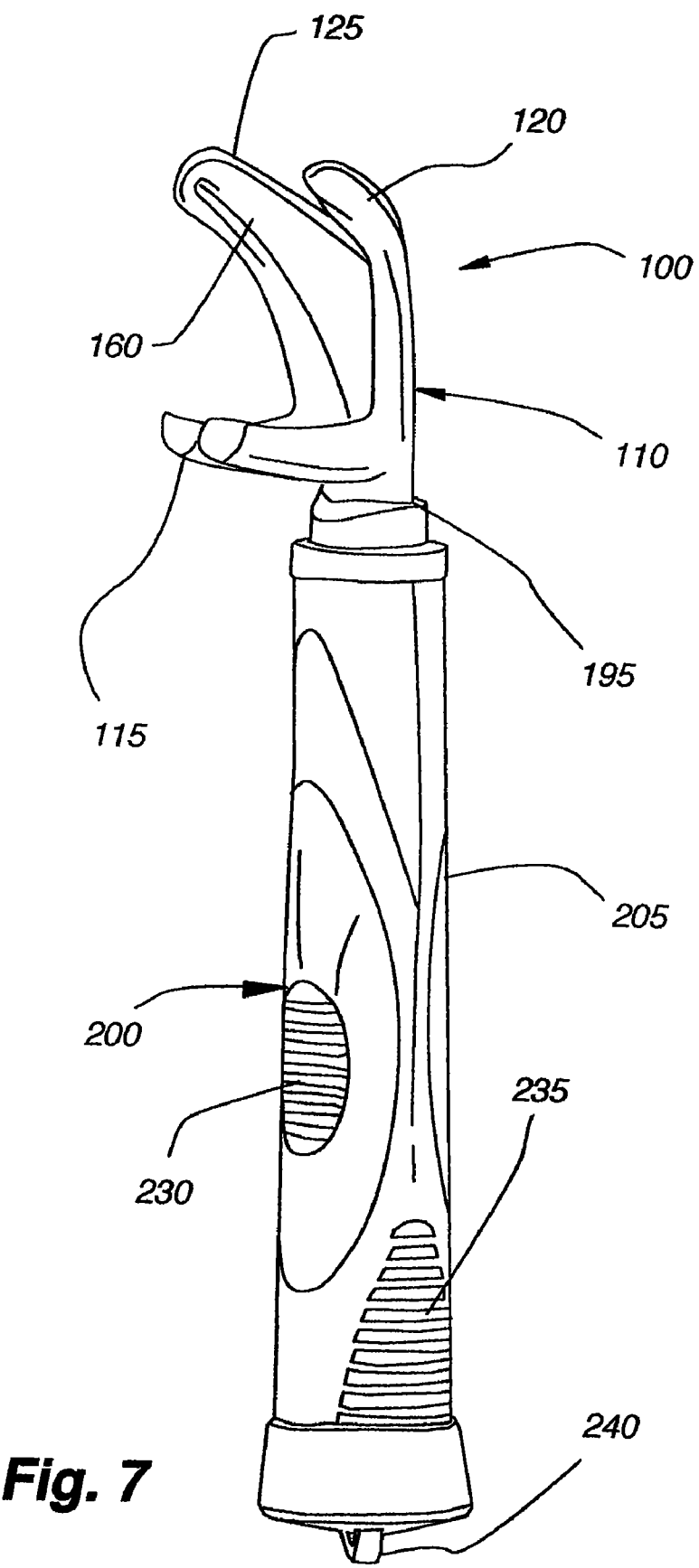
FIG. 7 depicts the embodiment with the handle in a first operating position.
Figure 8:
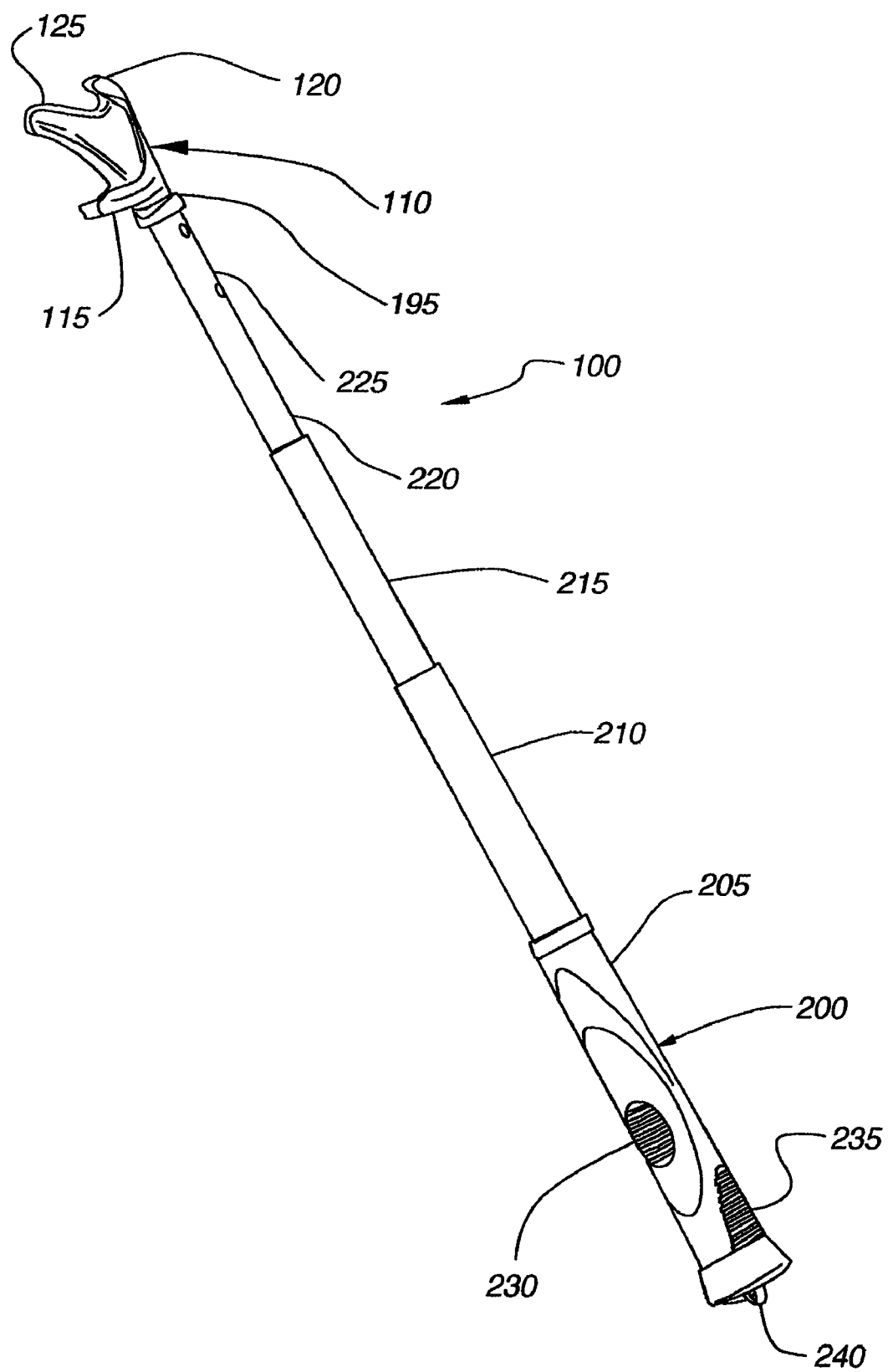
FIG. 8 depicts the embodiment with the handle in a second operating position.

FIGS. 7 and 8 generally show the handle 200 in a first operating position (FIG. 7) and a second operating position (FIG. 8). The handle 200 may be made of multiple segments, such as a first handle segment 205 and second handle segment 210. The handle 200 may telescope, such that the second handle segment 210 can at least partially extend from (and retract into) the first handle segment 205 through a hole in the top of the first handle segment 205. When the second handle segment 210 (and third handle segment 215, fourth handle segment 220, etc.) are contained within the first handle segment 205, as shown in FIG. 7, the handle 200 is retracted to a first operating position. When the second handle segment 210 (and any other handle segments 215, 220, 225) extend from the first handle segment 205, the handle 200 is in a second operating position as shown in FIG. 8. Generally, the handle 200 is longer in the second operating position than the first operating position.

The first operating position, with the handle 200 retracted, is space-efficient in comparison to the second operating position. Thus, a user may elected to store and/or carry the throwing/retrieving apparatus 100 with the handle 200 in the first operating position. By contrast, the second operating position may permit a user to retrieve a ball 105 from the ground or another surface without unduly bending over or down. Further, the extended length of the handle 200 in the second operating position permits a user to move the claw 110 (and any gripped ball 105) across a longer arc, thus imparting more momentum to the ball 105 and enabling the ball 105 to be thrown longer distance.

It should be noted that more than two handle segments 205, 210 may be employed in the throwing/retrieving apparatus 100. For example and as shown to best effect in FIG. 8, one embodiment of the throwing/retrieving apparatus 100 employs five handle segments 205, 210, 215, 220, 225. The fifth handle segment 225 is sized to nest within the fourth handle segment 220, which in turn is sized to nest within the third handle segment 215, and so on. Accordingly, although the below description refers generally to a first and second handle segment 205, 210, it applies equally to additional handle segments that may be used in certain embodiments of the throwing/retrieving apparatus 100.

The base of the second handle segment 210 may typically larger than the diameter of the hole to prevent the two handle segments 205, 210 from disconnecting. When the handle 200 is at full extension (i.e., the second handle segment 210 is extended its maximum distance out of the first segment 205), friction between the outer side wall of the second handle segment 210 and circumference of the hole may resist retraction of the second handle segment 210 into the first handle segment 205. Alternatively, a pin, support, clip, snap or fastening mechanism may maintain relative positions of the first and second handle segments 205, 210 when the handle 200 is at full extension. It should be understood that more than two handle segments 205, 210 may be used. For example, three separate handle segments may be employed, with a third handle segment telescoping outward from the second handle segment.

One or more handle segments 205, 210, 215, 220, 225 may include an anti-rotation feature preventing adjacent handle segments 205, 210, 215, 220, 225 from rotating with respect to one another. For example, one or more handle segments 205, 210, 215, 220, 225 (and the holes through which they pass) may be D-shaped in lateral cross section. Alternatively, a spine, keying feature, projection, protrusion, and so forth may be formed on a handle segment and be received in a matching opening formed in, or as part of, the hole. Accordingly, the combination of keying feature etc. and opening may combine to prevent rotation of adjacent handle segments 205, 210, 215, 220, 225 with respect to each other.

As shown in FIGS. 1A-8, one or more gripping surfaces 230, 235 may be formed on the outer surface of the handle 200. These gripping surfaces 230, 235 may be formed from the same material as the handle 200 or a different material. Typically, although not necessarily, the gripping surfaces 230, 235 are formed on the first handle segment 205 and raised from the outer surface of the first handle segment 205. The gripping surfaces 230, 235 may be formed from a material that provides a non-slip grip for a user's hand or a more secure grip than the handle 200 alone, such as rubber, foam, thermoelastic resin or a soft plastic. The exact pattern, placement, size and/or dimensions of the gripping surfaces 230, 235 may vary in different embodiments. Accordingly, the gripping surfaces 230, 235 depicted in FIGS. 1A-8 should be understood to be exemplary.

A clip or other retaining device 240 may be affixed to the outside of the first handle segment 205 to permit the throwing/retrieving apparatus 100 to be affixed to other supports or structures for carrying or storage. For example, the retaining device 240 may permit a user to clip the throwing/retrieving apparatus 100 to a belt or belt loop for carrying, or to hang the throwing/retrieving apparatus 100 from a hanger for storage.

A method for manufacturing a throwing/retrieving apparatus 100 will now be disclosed. The claw 110 may be injection molded from a plastic, such as an acrylonitrile-butadiene-styrene ("ABS") copolymer. Further, the claw 110 may be injection-molded as a single part or multiple parts. For example, the claw may be molded in two parts that are then affixed to one another. The claw parts may be affixed to one another mechanically (such as with a screw or bolt) or chemically (such as with an adhesive, by heat or sonic welding, or a chemical reaction). For example, the claw 110 may be molded as a left and a right piece that are then affixed or otherwise joined together.

Each segment 205, 210, 215, 220, 225 of the handle 200 may be separately blow molded from a suitable material, such as a polypropylene plastic. Alternatively, the inner (second, third, etc.) segments 210, 215 of the handle 200 may be blow molded while the first handle segment 205 is injection molded from either ABS plastic or polypropylene (or any segment may be injection molded). The handle segments 205, 210, 215, 220, 225 may then be placed one within the other and the base of the first handle segment 205 capped or sealed to hold the other handle segments 210, 215, 220, 225 within. Any handle segment, including the first handle segment, may be formed as a unitary piece or assembled from one or more separate pieces. For example, the first handle segment 205 may be made of a first half and second half joined together.

A lock switch 245 (see FIG. 1B) may be affixed to the outer handle segment, or otherwise included in the embodiment. The lock switch 245 generally permits the handle 200 to telescope or extend when placed in an "on" position and prevents the handle 200 from telescoping or extending when placed in an "off" position.

The throwing/retrieving apparatus 100 has been described with respect to particular embodiments and methods of manufacturing. However, it will be apparent to those of ordinary skill in the art that certain modifications may be made to the embodiments and methods disclosed herein without departing from the spirit or scope of the invention. For example, portions of the embodiments disclosed herein may be made from alternative materials such as different plastics, metals, wood, and so forth. The handle segments may be injection-molded instead of blow molded, and/or made from ABS plastic. Likewise, the claw and/or outer handle segment may be made from polypropylene. Additionally, portions of the handle and/or claw may be formed in separate sections and affixed to one another. Further, alternative embodiments of the present invention may employ four or more prongs instead of three.

All directional references (for example, upper, lower, upward, downward, left, right, leftward, rightward, top, bottom, above, below, vertical, horizontal, clockwise and counterclockwise) are only used for identification purposes to aid the reader's understanding of the embodiments of the present invention and do not create limitations, particularly as to the position, orientation or use of the invention unless specifically set forth in the claims. Joinder references (for example, attached, coupled, connected, joined and the like) are to be construed broadly and may include intermediate members between a connection of elements and relative movement between elements. As such, joinder references do not necessarily infer that two elements are directly connected and in fixed relation to each other.

In methodologies directly or incorrectly set forth herein, various steps and operations are described in one possible order of operation that those skilled in the art recognizing the steps in operation can be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention defined in the appended claims.

Accordingly, the proper scope of the invention is determined in the following claims.

We claim:

1. A ball-throwing apparatus, comprising:
a three-prong claw-shaped member operative to grasp a ball including a diameter; and
a handle attached to the three-prong claw-shaped member; wherein the three-prong claw comprises:
a first prong;
a second prong operatively attached to the first prong;
a third prong operatively attached to the first prong;
the first prong, the second prong, and the third prong configured to define a space for receiving the ball, the space defining a spherical diameter less than the diameter of the ball;
the first prong, the second prong, and the third prong further configured to expand away from the space when receiving the ball within the space and to exert a force on the ball sufficient to retain the ball within the space; and
the first prong extends further from a longitudinal axis of the handle than the second and third prongs wherein the first prong comprises a first length and a first width; and the first width is curved along at least a portion of the first length; and, wherein the second prong comprises a second width and second length; the third prong comprises a third width and a third length; the second length is at least partially curved; and the third length is at least partially curved.

2. The ball-throwing apparatus of claim 1, wherein:
the first prong and second prong form a first shape; and
the first prong and third prong form a second shape.

3. The ball-throwing apparatus of claim 2, wherein the first shape and the second shape are chosen from a group comprising a C-shape, a V-shape, and a U-shape.

4. The ball-throwing apparatus of claim 1, wherein both the second width and third width are flat.

5. The ball-throwing apparatus of claim 1, wherein the handle comprises:
a first handle section; and
a second handle section, the second handle section operative to extend from the first handle section.

6. The ball-throwing apparatus of claim 5, further comprising:
a lock switch operatively attached to the first handle section; wherein
the lock switch prevents the second handle section from extending from the first handle section.

7. The ball-throwing apparatus of claim 1, wherein the second handle section is operative to retract at least partially within the first handle section.

8. The ball-throwing apparatus of claim 7, further comprising an anti-rotational feature operatively associated with the first handle section and second handle section, the anti-rotation feature operative to prevent the first handle section from rotating with respect to the second handle section.

9. The ball-throwing apparatus of claim 1, further comprising a retention element operatively attached to the handle.

10. The ball-throwing apparatus of claim 1, wherein the first prong, the second prong and the third prong cooperatively hold the ball.

* * * * *